Oct. 31, 1961 O. J. MURPHY 3,007,145

SYNCHRONIZING CIRCUIT FOR MAGNETIC DRUM

Filed May 22, 1956 2 Sheets-Sheet 1

INVENTOR
O. J. MURPHY
BY Kenneth B Hamlin
ATTORNEY

INVENTOR
O. J. MURPHY
BY Kenneth B Hamlin
ATTORNEY

United States Patent Office 3,007,145
Patented Oct. 31, 1961

3,007,145

SYNCHRONIZING CIRCUIT FOR MAGNETIC DRUM

Orlando J. Murphy, New York, N.Y., assignor to Bell Telephone Laboratories, Incorporated, New York, N.Y., a corporation of New York Filed May 22, 1956, Ser. No. 586,544
7 Claims. (Cl. 340—174.1)

Figure 1:
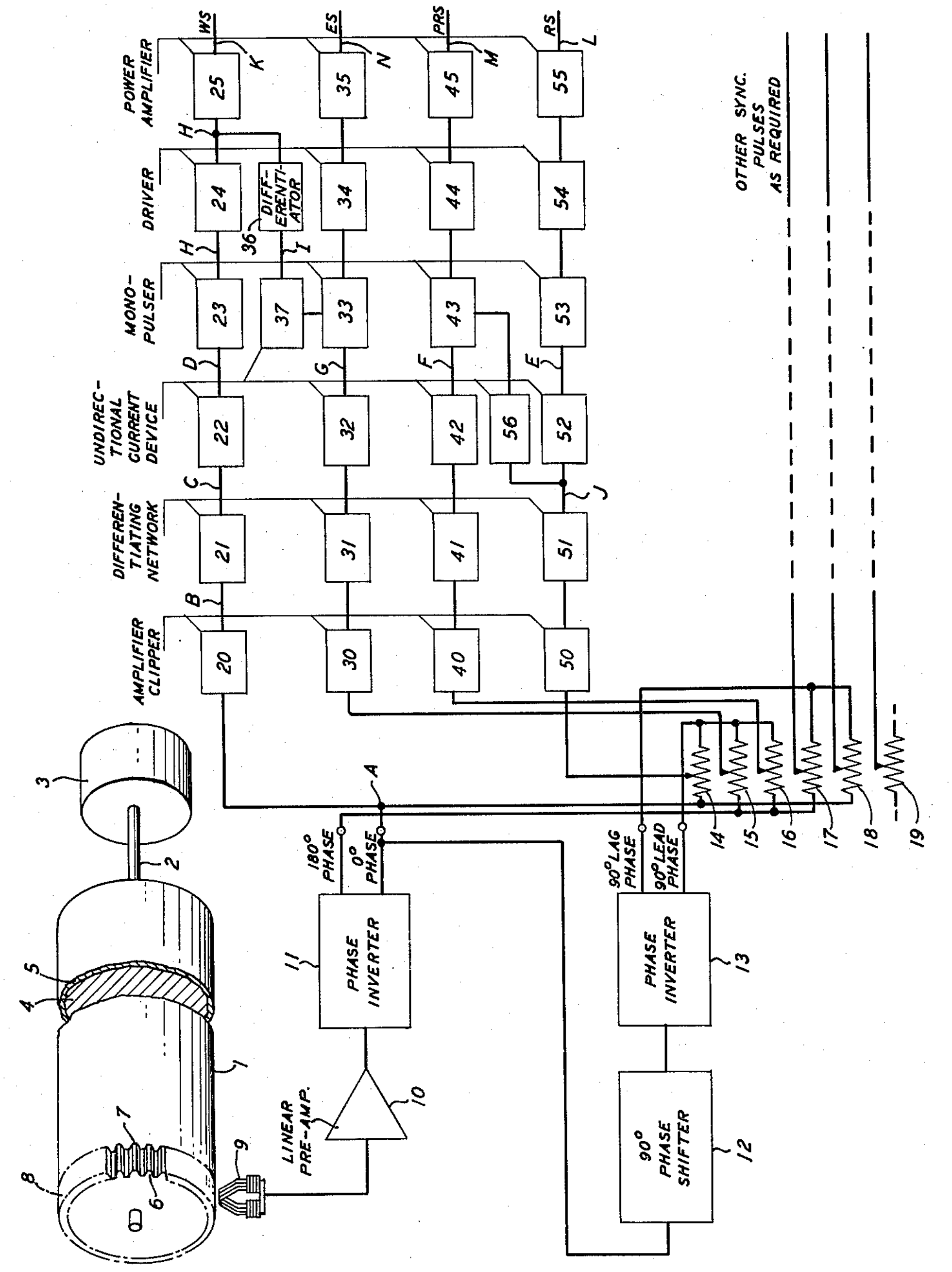

This invention relates to magnetic recording and particularly to methods and apparatus for controlling the initiation and termination of events at different times during the passage of an incremental area on the surface of a movable magnetizable medium past a transducer. More particularly, the present invention relates to a synchronizing circuit for producing synchronizing pulses to control the occurrence of events such as enabling operations, data reading operations, data recording operations, resetting operations and checking operations during each passage of an incremental area on the surface of a rotating magnetic drum past a magnetic head.

A magnetic drum essentially comprises a means for rotating a thin cylindrical shell of magnetic material rapidly past one or more magnetic heads located adjacent to but out of contact with the rotating surface. Each magnetic head comprises one or more coils surrounding a core element and may be used either as a recording (writing) or reading instrumentality.

Magnetic drum data storage systems operate on the principle of producing a pattern of magnetic marks on the surface of the drum for each item of information to be stored. This pattern is arranged in ordered columns, each column being defined by the circumferential area of the drum which passes immediately under or which is influenced by a single magnetic head. These columns on the drum are termed "tracks." The marks are further arranged in ordered rows termed "slots" (a contraction of the term "time-slot") as defined by the occurrence of each pulse of a train of synchronizing pulses produced in synchronism with rotation of the drum. The part of a track which is directly under, or which is influenced by, a single magnetic head when one synchronizing pulse of this train occurs and which is defined by the intersection of a track and a slot, is known as a "cell" and is the incremental area on the drum surface in which a single magnetic mark may be entered. A slot is therefore the aggregate of all of the cells of the drum which pass under or which are influenced by their respective magnetic heads during the occurrence of any one synchronziing pulse of the train of pulses. The simplest arrangement of a slot is a rectangular area running parallel to the axis on the surface of the drum. In the usual case, however, the slot will be more complicated in form. When the various magnetic heads are staggered or positioned in the form of a helix around the drum, the slot pattern on the surface of the drum will be sawtoothed in form or helical in form.

The recording of data on a magnetic drum may be considered a writing operation and because writing and erasing are complementary processes, they may be considered as writing "X" or writing "0." Initially, in one common form of magnetic recording, the entire drum is magnetized to saturation in the same direction. To record a bit of information in a cell, the cell is magnetized to saturation in the opposite direction by the application of a magnetic field. Due to the retentivity of the magnetic material, the cell will remain magnetized in that direction until restored to normal (erased) by a field of opposite polarity. Data is recorded on or read from the drum by the magnetic heads. A mark is recorded, that is, an X is written, in a particular cell by passing a short pulse of current through the coil of the magnetic head while the head is over that cell. The mark is erased, that is, a 0 written, by passing a current pulse of opposite polarity through the coil on the magnetic head.

The basic operations or functions required in magnetic drum systems include the reading of data recorded on the drum, the combining of the data read from the drum with data stored in external registers, the erasing of recorded data and the recording of new data on the drum. These operations require synchronizing pulses to synchronize the magnetic drum system and may include such synchronizing pulses as enabling synchronizing pulses to enable logic circuitry during the reading and writing interval of each slot on the drum, synchronizing pulses to control the reading of data from external registers such as flip-flop circuits prior to the reading interval in each slot on a magnetic drum, read synchronizing pulses to synchronize the reading of data from the drum, write synchronizing pulses to synchronize the writing of data on the drum, reset synchronizing pulses to reset logic circuitry in preparation for operations in succeeding slots on the drum, check synchronizing pulses for checking data read from the drum and other types of synchronizing pulses.

In many of the magnetic drum systems known in the art, several of the above-mentioned operations or functions must occur during the passage of each cell under a magnetic head. For example, those systems which utilize the "single pass" method of reading and writing information in a single pass of a cell under a magnetic head such as disclosed in Patent 2,700,148, issued January 18, 1955, to J. H. McGuigan, O. J. Murphy and N. D. Newby, require a read synchronizing pulse and a write synchronizing pulse to control the reading and writing functions during the passage of the cell under the magnetic head. Other types of magnetic drum systems require, in addition to a read synchronizing pulse and a write synchronizing pulse, such pulses as a reset synchronizing pulse and a check synchronizing pulse. Such a system is disclosed in Patent 2,723,311, issued November 8, 1955, to W. A. Malthaner and H. E. Vaughan. Depending upon the type of logic utilized in a magnetic drum system and the type of operation required, the number, type, duration and interval at which these synchronizing pulses occur during the passage of each cell under a magnetic head may vary. It is imperative, however, that the synchronizing pulses which occur during the passage of one cell under a magnetic head also occur in the same phase relationship during the passage of the next and succeeding cells under the head and the same phase relationship must be maintained for all subsequent passages of the same cell under the head.

In order to control the repeated occurrences of the various operations or functions required in each slot on a magnetic drum, a separate train of synchronizing pulses for each required function or operation must be produced. The method heretofore employed for producing the required trains of synchronizing pulses utilizes a series of magnetic marks or X's recorded in a timing track around the circumference of the drum, one mark for each slot on the drum. Some systems have heretofore utilized a timing wheel in the form of a toothed gear constructed of magnetic material in which each tooth of the gear wheel is used in place of a magnetic mark on the drum. Still other systems have utilized a plurality of timing gear teeth cut in the magnetic material on the surface of the drum itself. The timing track, be it a series of magnetic marks or a plurality of gear teeth, is read by a magnetic head to produce an approximate sinusoidal signal voltage at its output. The output signal will have one complete cycle for each mark or tooth read. This sinusoidal signal is then applied through one stage of amplification to a second overbiased stage of amplification so that only the peak of the positive portion of the sinusoidal voltage excursion provides an output signal and this signal is in the form of a negative going voltage pulse. The leading edge of each of the negative going voltage pulses is used to trigger a monopulser circuit which will produce one pulse in a train of synchronizing pulses. These same negative going voltage pulses may be delayed in a delay circuit and applied to a second monopulser circuit to provide the pulses for an additional train of synchronizing pulses. In some systems, the trailing edges of the synchronizing pulses produced by the first monopulser are utilized to trigger the second monopulser circuit for producing the second train of synchronizing pulses. For example, in one such system, the negative going voltage pulses from the output of the overbiased amplifier connected to the magnetic head associated with the timing track on the magnetic drum are applied to a read sync monopulser circuit, the output of which provides a train of read sync pulses. The train of read sync pulses from the output of the read sync monopulser is also applied to a second monopulser, a write sync monopulser; and the trailing edge of each read sync pulse is utilized to trigger the write sync monopulser to produce a train of write sync pulses. With this arrangement, therefore, each write sync pulse is not initiated until its associated read sync pulse is terminated so that there is no overlapping of the two pulses. The original negative going voltage pulses from the overbiased amplifier are also applied to a delay monopulser, the output of which is in turn applied to a check monopulser to provide a train of check sync pulses each of which overlaps both a read sync and a write sync pulse.

The above-described method of producing trains of synchronizing pulses has several disadvantages. One of the most troublesome is that the speed of rotation of a magnetic drum must be accurately controlled within close tolerances because variations in speed of rotation of the drum will cause corresponding variations in the times at which the synchronizing pulses are produced. The duration of the read sync pulses is controlled by the circuit constants of the read sync monopulser and, accordingly, there is no absolute phase relationship between the trailing edge of the read sync pulses and the surface of the magnetic drum. Because the initiation of the write sync pulses is controlled by the trailing edge of the read sync pulses, there is therefore no absolute phase relationship between the write sync pulses and the surface of the magnetic drum. As circuit constants in the various monopulsers age, the duration of pulses produced thereby may vary somewhat and in turn will cause a variation in the phase of the resulting synchronizing pulses controlled thereby with respect to the surface of the magnetic drum. If the speed of rotation of the magnetic drum varies, the sync pulses produced by the above-described method will occupy a different fraction of the total cell time because the cell time itself varies in inverse proportion to drum speed.

Another disadvantage encountered in the above-described method of producing trains of synchronizing pulses is caused by slight irregularities in the magnetic material on the surface of the magnetic drum or by slight irregularities in the recording of the X signals or in the cutting of teeth in the timing track on the drum. The amplitude of the resulting sinusoidal signal applied to the overbiased amplification stage may vary slightly from cycle to cycle. Because the time during which the overbiased amplifier conducts is controlled by the peak or amplitude of the signal applied to its input, the interval between the leading edges of the output negative going voltage pulses may vary slightly. As a result of these slight variations in the time at which the negative going voltage pulses are produced, the times at which the monopulser circuits are actuated to produce the synchronizing pulses vary slightly with the resulting possibility that errors in the initiation and termination of the required operations and functions in the magnetic drum system will result.

Still another disadvantage encountered in the above-described method of producing trains of synchronizing pulses results from the inherent inflexibility of the circuits. No means are available for readily adjusting the relative phases between the individual trains of synchronizing pulses and the surface of the magnetic drum or for adjusting or changing the phase of one train of synchronizing pulses with respect to the other trains of synchronizing pulses.

An object of the present invention is the provision of an improved synchronizing circuit for a magnetic drum wherein the above-described disadvantages are alleviated.

It is a further object of the present invention to increase the reliability, dependability and accuracy of synchronizing circuits utilized to produce synchronizing pulses for controlling the initiation and termination of events in a magnetic drum system.

An additional object of the present invention is to increase the flexibility and ease of making adjustments in the phasing of synchronizing circuits utilized to produce trains of synchronizing pulses for controlling the initiation and terminaton of events during the passage under magnetic heads of each slot on a rotating magnetic drum.

The present invention, therefore, is an improved synchronizing circuit for producing synchronizing pulses to control the initiation and termination of events during the passage under magnetic heads of each slot on a rotating magnetic drum wherein the aforementioned objects are attained.

The synchronizing circuit of the present invention is an improvement over such circuits disclosed, for example, in the aforementioned patent of W. A. Malthaner and H. E. Vaughan and in the copending application of C. E. Brooks, W. O. Fleckenstein, R. C. Lee and H. N. Seckler, Serial No. 554,280, filed on December 20, 1955, now Patent 2,876,288, granted March 3, 1959.

In accordance with the present invention, a sinusoidal signal is generated by a timing track on a rotating magnetic drum and in synchronism with the rotation of the drum so that each cycle of the signal defines one slot on the surface of the drum. This signal is then utilized to produce a four-phase output of the original signal, one being in phase with the original signal, one being 180 degrees out of phase with the original signal, one leading the original signal by 90 degrees and one lagging the original signal by 90 degrees. By combining selected fractional amplitudes from each of a selected adjacent pair of the four phases of sinusoidal signal, a new sinusoidal signal may be produced which has a phase intermediate between the two 90-degree components used to produce it. Therefore, a plurality of such sinusoidal signals having predetermined and adjustable phase relationships to one another and to the original signal generated by the timing track may be produced.

In order to control the occurrence of a plurality of events at different times within the period of each slot on the rotating magnetic drum a corresponding plurality of voltage pip-producing circuits are supplied with individual sinusoidal signals produced as described above and having phase relationships to one another such that their zero axis crossings which will be used to produce the voltage pips, fall within the period of each slot where it is desired that said events occur.

The zero axis crossings of a sinusoidal wave are independent of amplitude variations of the wave and are also the points which, on the basis of amplitude recognition, are most precisely defined in time because the slope of the wave is greatest at these points. Therefore, it is advantageous to utilize the zero axis crossings of the sinusoidal signals to control the pip-producing circuits thereby making the phase of the output pips independent of amplitude variations of the input sinusoidal signals.

As disclosed in the copending application of H. A.

Henning and O. J. Murphy, Serial No. 554,247, filed December 20, 1955, now Patent 2,886,802, issued May 12, 1959, one way in which to utilize the zero axis crossings of a sinusoidal signal to produce coincident voltage pips is to amplify the signal by means of a linear amplifier, symmetrically clip the resultant output signal at an amplitude of a volt or so above and below the zero axis thus producing a trapezoidal wave and repeat the process of amplifying the clipping as many times as may be necessary to secure a "square" wave of sufficiently rapid rise and fall times. The square wave is then electrically differentiated to produce pips of very short duration. The pips so produced accurately define in time the axis crossings of the original wave and can be used to control pulse forming devices such as monopulsers for generation of synchronizing pulses of the desired duration.

In the present invention, each train of voltage pips produced in the manner described above is utilized to trigger an individual monopulser circuit whose constants have been set to provide output voltage pulses of the desired duration. Monopulsers, being self-timing circuits, introduce the element of absolute time which heretofore has been absent. In the description of the present invention up to this point, all operations have been described with respect to relative phase. This means that the output synchronizing pulses derived from a monopulser may occupy a different fraction of a total cell time as the speed of the magnetic drum varies because the cell time itself varies in the inverse proportion to drum speed. For some types of synchronizing pulses, the position of the trailing edge of the pulse within a cell period does not matter within reasonable limits and in these cases, the monopulser may be allowed to be self-timing. In other instances, however, it is important that the trailing edge of a synchronizing pulse of one train of pulses be substantially coincident with the leading edge of a synchronizing pulse of another train of pulses. This requirement can be met and, in general, the requirement of constant phase duration rather than constant time duration can be met in accordance with the present invention by utilizing another train of voltage pips having the desired phase relation to reset prematurely the monopulser whose normal timing has been adjusted to exceed the longest phase period to be covered. In the event of a desired coincidence between the trailing edge of one synchronizing pulse and the leading edge of another, a single voltage pip may be utilized to terminate the one and initiate the second.

Because amplitude variations in the sinusoidal signals utilized to produce the trains of voltage pips will not affect the phasing of the pips and because each train of voltage pips has a constant and predetermined phase relationship to the circumferential surface of the magnetic drum, the phasing of the voltage pips will be unaffected by variations in the speed of rotation of the drum. Therefore, by utilizing individual trains of voltage pips, the pips in each train being settable to a predetermined phase relationship to a cell traverse period to both trigger and reset monopulsers, a plurality of trains of synchronizing pulses are produced in which the leading edges and the trailing edges have a constant spatial or phase relationship to the circumferential surface of the magnetic drum rather than a time relationship and hence, are not affected by variations or irregularities in the speed of rotation of the magnetic drum.

A feature of the present invention relates to means in a synchronizing circuit for producing a plurality of synchronizing pulses during the passage under magnetic heads of each slot on a rotating magnetic drum whereby each of said plurality of synchronizing pulses has a predetermined and constant phase relationship to the slot traverse interval and a predetermined and constant phase relationship to the other of said synchronizing pulses produced during the same slot traverse interval.

Another feature of the present invention relates to circuits and apparatus for producing any desired number of synchronizing pulses each having a predetermined constant phase relationship with the other of said synchronizing pulses from four phases of a sinusoidal signal generated from a timing track on a rotating magnetic drum.

In synchronizing circuits utilized to produce synchronizing pulses to control the initiation and termination of events in a magnetic drum system, it is advantageous to be able to readily adjust the phasing of the synchronizing pulses in order to facilitate the making of changes in the times that such events are initiated or terminated. This is particularly advantageous during the development of a magnetic drum system when the exact phase requirements are not known and during the fabrication of the system when adjustments and alignments are necessary. Furthermore, the aging of circuit components after the system is in operation may necessitate adjustments in the phase requirements.

Another feature of the present invention relates to circuits and apparatus to facilitate adjustments in the phases of the leading edges, the trailing edges, or both, of synchronizing pulses utilized to control the initiation or termination of events during the passage under magnetic heads of each slot on a rotating magnetic drum.

Figure 2:
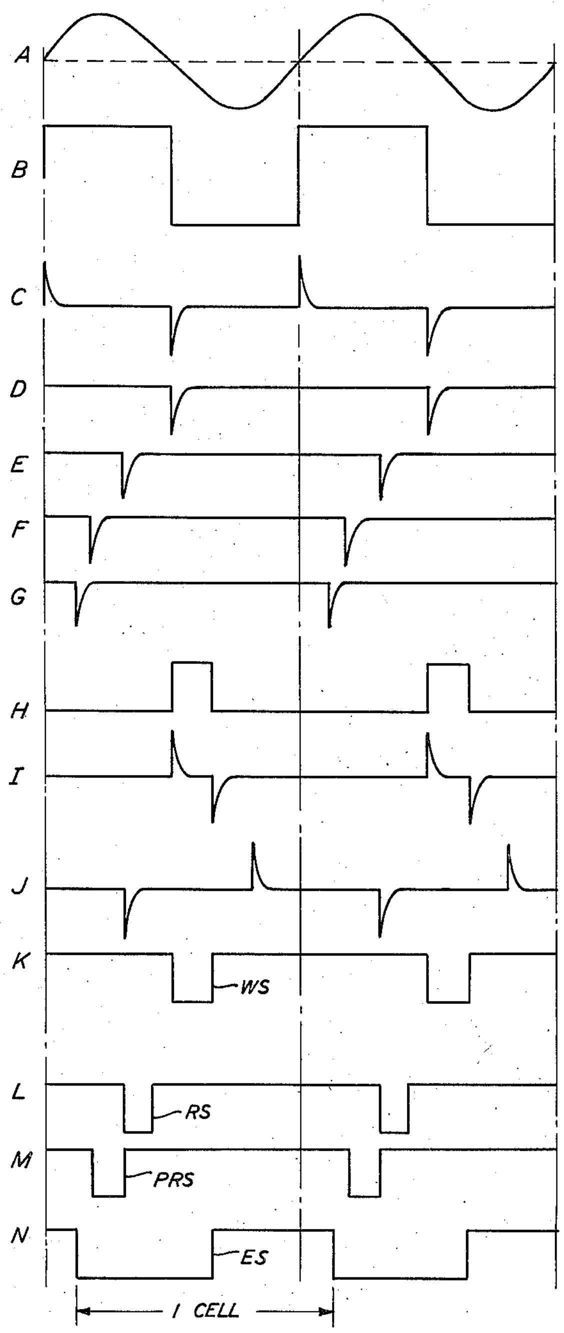

The foregoing and other objects and features of the present invention will be more readily understood from the following description of an illustrative embodiment thereof when read with reference to the accompanying drawings in which:

FIG. 1 shows in block schematic form an illustrative embodiment of the synchronizing circuit of the present invention; and FIG. 2 shows graphical representations of various voltage wave forms obtained at designated points in the circuit of FIG. 1.

FIG. 1 of the drawings is a block diagram representation of one illustrative embodiment of the synchronizing circuit of the present invention which provides at each of four outputs a train of sharply defined synchronizing pulses. For purposes of identification, these pulse trains are designated WS for write synchronizing pulses, ES for enabling synchronizing pulses, PRS for preread synchronizing pulses and RS for read synchronizing pulses. The ES enabling synchronizing pulses may be utilized in a magnetic drum system to enable logic circuitry during the reading and writing portion of each slot interval. The preread synchronizing pulses PRS may be utilized in a magnetic drum system to control and synchronize the reading of data from external memory such as flip-flops or registers prior to the reading of data from a slot on the magnetic drum. The WS write synchronizing pulses may be used to synchronize the writing operations in a magnetic drum system and the read synchronizing pulses RS may be utilized to synchronize reading operations in a magnetic drum system.

As shown in FIG. 1, magnetic drum 1 is mounted on shaft 2 and is rotated continuously by motor 3. Magnetic drum 1 may be constructed of any suitable nonferrous material on which a thin coating of magnetic material is plated or otherwise applied. This is illustrated in the cut-away section of drum 1 shown in the drawing where the basic structure 4 of drum 1 may be an insulating material or material such as brass or aluminum on which a thin layer of magnetic material 5 such as an alloy of nickel and cobalt is electroplated.

As shown in FIG. 1, a timing track indicated generally at 8 is provided on magnetic drum 1 and comprises a series of equally spaced magnetic segments 7 around the circumference of drum 1. These segments 7 are formed by cutting a plurality of equally spaced parallel notches 6 through the magnetic material 5 on the surface of drum 1. The segments 7 of magnetic material 5 between adjacent notches 6 are magnetized and thus form magnetized timing segments. One segment is provided for each slot on magnetic drum 1.

As drum 1 rotates, the magnetized segments pass pick-up head 9 and the magnetic reluctance of the flux path from the magnetized segments through the core structure of pick-up head 9 changes in a cyclic manner giving rise to corresponding changes in magnetic flux in the core structure. The cyclically changing flux in the core structure of pick-up head 9 induces a nearly sinusoidal voltage in the coil of pick-up head 9 and, hence, a quasi-sinusoidal voltage is obtained from the output of pick-up head 9. Pick-up head 9 may be any of the conventional magnetic heads known in the art such as, for example, the magnetic transducer head disclosed in Patent 2,592,-652, granted to F. G. Buhrendorf on April 15, 1952. The output of the magnetic head will be more nearly sinusoidal as described if the gap between the pole tips of head 9 is adjusted to be approximately equal to the width of the magnetized timing segments.

The relatively weak quasi-sinusoidal signal from the output of pick-up head 9 is applied to a linear preamplifier 10. Preamplifier 10 may be a conventional three-stage broad-band preamplifier or any type of linear amplifier which increases the amplitude of the signal to approximately 2 volts peak to peak, for example. The output of linear preamplifier 10 is then applied to a phase inverter 11 to provide an in-phase and anti-phase output labeled, respectively, "0-degree phase" and "180-degree phase" as shown in FIG. 1. Phase inverter 11 may advantageously be a conventional circuit comprising a single triode having equal load resistors in the plate and cathode circuits which may be selected, for example, to provide at each of the two outputs a sinusoidal signal of approximately 2 volts peak to peak.

A bridging connection is made from the 0-degree phase output of phase inverter 11 to the input of a 90-degree phase shifter 12. Phase shifter 12 may advantageously be any of the conventional 90-degree phase shifter circuits described on pages 136 through 140 of the M.I.T. Radiation Laboratory Series, volume 19, entitled, "Waveforms," published by the McGraw-Hill Book Company, Incorporated, in 1949. The output from 90-degree phase shifter 12, which is a sinusoidal signal shifted 90 degrees in phase from the input signal, is applied to phase inverter 13 similar in type to phase inverter 11. Phase inverter 13 therefore provides an in-phase and anti-phase output of the shifted input signal. These are designated "90-degree lag phase" and "90-degree lead phase" as shown in FIG. 1. One of the outputs of phase inverter 13 is, therefore, a sinusoidal signal having a phase lag of 90 degrees with respect to the 0-degree phase and the other output may, therefore, be construed to have a lead of 90 degrees with respect to the 0-degree phase. The gains and losses in 90-degree phase shifter 12 may be adjusted so that each of the two 90-degree outputs, leading and lagging, has an amplitude of approximately 2 volts peak to peak. Thus far, four sinusoidal signals separated 90 degrees in phase have been produced from the original weak single phase sinusoidal signal obtained from the output of pick-up head 9.

By combining selected fractional amplitudes of each of a selected adjacent pair of the four phases of sinusoidal signal, new sinusoidal signals may be produced having phases intermediate between the two 90-degree components used to produce them. For example, by connecting the 0-degree phase sinusoidal signal and the 90-degree lead phase sinusoidal signal to potentiometer 14 as shown in FIG. 1, a new sinusoidal signal may be obtained from the slider arm which will lead the 0-degree phase signal by any selected amount from 0 degrees to 90 degrees. Similarly, by connecting the 90-degree lead phase signal and the 180-degree phase signal to potentiometer 15, a sinusoidal signal may be obtained from its slider which leads the 0-degree phase signal by any selected amount from 90 degrees to 180 degrees. Likewise, by connecting the 90-degree lag phase signal and the 180-degree phase signal to a potentiometer, such as potentiometer 17 shown in FIG. 1, a sinusoidal signal may be obtained which leads the 0-degree phase signal by any selected amount between 180 degrees and 270 degrees. This is tantamount to a sinusoidal signal lagging the 0-degree signal by any settable amount between 90 degrees and 180 degrees. Also, by connecting the 90-degree lag phase signal and the 0-degree phase signal to a potentiometer, such as potentiometer 18 shown in FIG. 1, a sinusoidal signal may be produced which lags the 0-degree phase signal by any settable amount between 0 degrees and 90 degrees. The number of sinusoidal signals produced by potentiometers 14 through 19 will vary in accordance with the requirements of the particular magnetic drum system and the particular phase relations between these signals may be adjusted by adjusting the potentiometers in accordance with the requirements of the system. The maximum number of output signals obtainable from such an arrangement is determined only by the loading represented by the potentiometers.

Because the intermediate phase sinusoidal signals are produced by combining selected fractional amplitudes of two adjacent phase signals of the four phases of the original signal and because the phasing of the intermediate phase signals may be adjusted by movement of a potentiometer arm, the 180-degree phase signal need not have a phase difference of exactly 180 degrees with respect to the 0-degree phase signal and it need not have exactly the same amplitude nor must the 90-degree lead phase signal and 90-degree lag phase signal lead and lag, respectively, the 0-degree phase signal by exactly 90 degrees and have exactly the same amplitude. It is important, however, that phase and amplitude relationships existing between the four phases of the original sinusoidal signal remain constant under all operating conditions. The amplitude of the output signals from the potentiometer arms varies somewhat as the arms are moved to provide the desired adjustment of phase, but this is of no importance in view of the clipping action which will take place in later parts of the circuit.

There is no prescribed relationship between the phase of the original sinusoidal signal from the output of pick-up head 9 and that of any of the desired output synchronizing pulses. The only requirements are those of timing and phasing among the various synchronizing pulses themselves plus the additional restriction that the arbitrary phase relations existing between the original signal and the synchronizing pulses must be closely maintained at all times and under all operating conditions. It is thus permissible to select any of the original four-phase sinusoidal signals to generate one of the synchronizing pulse trains, the other synchronizing pulse trains being generated by sinusoidal signals having phases suitably lagging or leading the selected phase signal.

As indicated hereinbefore, the illustrative embodiment of the present invention is a synchronizing circuit producing four trains of synchronizing pulses. These synchronizing pulses are produced by individual channels of pulse producing circuits and are controlled by individual sinusoidal signals whose phases are adjusted in potentiometers 14, 15 and 16 in accordance with the requirements of the magnetic drum system with which it will be utilized. As shown in the drawings, the 0-degree phase signal has been selected as the reference signal and is applied through a channel of pulse forming circuits shown in the upper part of FIG. 1 to provide the required write sync pulses WS. The 0-degree phase sinusoidal signal is shown graphically at A in FIG. 2. It is to be pointed out that the voltage wave forms shown in FIG. 2 are representative and are given for illustrative purposes only. The 0-degree phase sinusoidal signal is applied to a three-stage amplifier, two-stage clipper circuit 20 comprising symmetrical diode selecting circuits and linear amplifiers. The sinusoidal signal shown at A is applied to the input of the first amplifier stage and the output of this stage is applied to a diode selecting circuit where the signal is symmetrically clipped at approximately one volt above and below the zero axis of the signal. The clipped signal is then amplified in the linear amplifier of the second stage which provides an output trapezoidal signal of large amplitude having comparatively rapid rise and fall times. The trapezoidal wave signal is then applied to the second diode selecting circuit where the signal is again symmetrically clipped at approximately two volts above and below the zero axis of the signal. The resulting signal is again amplified in the linear amplifier of the third stage to provide an output trapezoidal wave signal of large amplitude having still more rapid rise and fall times. The output of the amplifier-clipper 20 is, therefore, an approximate square wave signal shown graphically at B in FIG. 2 with axis crossing times coinciding with the axis crossing times of the sinusoidal signal from which it was derived. Amplifier-clipper circuits suitable for use with the present invention are well known in the art and may, for example, be of the type disclosed in FIG. 9·37(*a*) on page 354 of the M.I.T. Radiation Laboratory Series, volume 19, entitled, "Waveforms," published by the McGraw-Hill Book Company, Incorporated, in 1949. The diode selecting circuit shown in this figure is advantageously modified to provide a small bias on each of the two diodes so as to provide symmetrical clipping at selected values of voltage above and below the zero axis of the input signal.

The square wave signal output from the amplifier-clipper 20 is then differentiated in a conventional RC differentiating network 21 to obtain a series of positive and negative going pips shown graphically at C in FIG. 2. This signal is then applied to a unidirectional current device 22 containing a varistor or rectifier to select only the negative going pips to provide the output signal shown graphically at D in FIG. 2.

The negative going pips from the output of unidirectional current device 22 are applied to the input of monopulser 23. Monopulser 23 is a single stability twin triode circuit in which a negative voltage pip applied to its input extinguishes the conduction in the normally conducting triode and causes conduction in the normally non-conducting triode for some period of time determined by the constants of the monopulser circuit. After this predetermined time, the monopulser will automatically reset itself to its normal or untriggered state. The output of monopulser 23 is taken from the plate of the normally conducting triode and thus is a positive voltage pulse which has a duration determined by the constants of the monopulser circuit. The output voltage pulses from monopulser 23 are shown graphically at H in FIG. 2. Monopulser circuits or monostable multivibrators are well known in the art and a number of typical such circuits are described on pages 166 through 171 of the M.I.T. Radiation Laboratory Series, volume 19, entitled "Waveforms," published by the McGraw-Hill Book Company, Incorporated, in 1949.

Monopulser 23 has now introduced into the circuit the element of absolute time which has heretofore been absent because all references have been to relative phase rather than to time. This means that the positive output pulse from monopulser 23 will occupy a different fraction of the total slot time as the speed of the drum varies because the slot time itself varies in inverse proportion to drum speed. For some types of synchronizing pulses used in magnetic drum systems, the position of the trailing edge of a synchronizing pulse within a magnetic drum slot does not matter within reasonable limits and in those cases, the monopulsers may be permitted to be self-timing. As will be described hereinafter, the trailing edge of the synchronizing pulses produced by monopulsers such as monopulsers 33 and 43 will be reset prematurely in accordance with a predetermined phase relation to the slot time. The square wave output pulses from monopulser 23 are applied to a cathode follower driver stage 24 of the conventional type and from there to a power output amplifier stage 25 which is designed for high current operation. The outputs from power amplifier 25 are taken from transformers in the plate circuit in the conventional manner so that either positive going or negative going write synchronizing pulses WS may be obtained. The negative going write sync pulses from power amplifier 25 are shown graphically at K in FIG. 2, and by suitably selecting the circuit constants of monopulser 23, may have a duration of two and one-half microseconds, for example.

As shown in FIG. 2, each of the remaining synchronizing pulses, the read sync pulses RS, the preread sync pulses PRS and the enabling sync pulses ES, lead the write sync pulses by a predetermined phase angle. For example, at a nominal frequency of 60 kilocycles per second, making each cell interval approximately 16 microseconds in duration, the leading edge of the read sync pulses may lead the write sync pulses by a time of the order of 3 microseconds, the leading edge of the preread sync pulses may lead the read sync pulses by a time of the order of 2 microseconds and the leading edge of the enabling sync pulses may lead the preread sync pulses by a time of the order of 1 microsecond. As shown in FIG. 1, each of the remaining trains of synchronizing pulses, enabling sync ES, preread sync PRS and read sync RS, is produced in an individual channel of pulse producing circuits similar to that described above for the write sync pulses WS. Each of these channels is controlled by an individual sinusoidal signal whose phase with respect to the phase of the one used to produce the write sync pulse has been adjusted in the potentiometers 14, 15 and 16 to provide the desired phasing.

As shown in FIG. 1, potentiometer 14 is connected to the 0-degree phase signal and the 90-degree lead phase signal. The output of potentiometer 14 is applied to amplifier-clipper 50 to provide an output square wave signal. This square wave signal is differentiated in differentiating network 51 to provide a series of positive and negative going voltage pips. The voltage pips from the output of differentiating network 51 are shown graphically at J in FIG. 2 and are applied to unidirectional current device 52 where the negative pips are selected. The negative pips from the output of unidirectional current device 52 are shown graphically at E in FIG. 2 and are applied to monopulser 53. The output of monopulser 53 is applied to a driver stage 54 and a power amplifier stage 55 to provide the required read sync pulses RS shown graphically at L in FIG. 2. The circuit constants of monopulser 53 are adjusted to provide output read sync pulses of 1.6 microseconds duration, for example.

Similarly, the 180-degree phase signal and the 90-degree lead phase signal are combined in potentiometer 15 whose output signal is applied to amplifier-clipper 30 to provide an output square wave signal. This square wave signal is differentiated in differentiating network 31 to obtain a series of positive and negative going voltage pips. The negative going voltage pips are then selected in a unidirectional current device 32 to provide the output signal shown graphically at G in FIG. 2. These negative going voltage pips are applied to monopulser 33. The output of monopulser 33 is applied through driver stage 34 and power amplifier 35 to provide outgoing enabling synchronizing pulses ES shown graphically at N in FIG. 2. As shown in FIG. 2, the enabling sync pulses ES have a duration of approximately 8.5 microseconds and the circuit constants of monopulser 33 are selected so that its normal timing would give a square pulse output exceeding this value. The enabling synchronizing pulses ES, as indicated hereinbefore, are the pulses which are utilized in a magnetic drum system to enable logic circuitry during the reading and writing operations of the system. It is advantageous, therefore, to have the enabling synchronizing pulses terminate when the writing functions are terminated. Therefore, the trailing edge of the write synchronizing pulses WS are utilized to prematurely reset monopulser 33 so that the termination of the enabling sync pulses coincides with the termination of the write sync pulses. As is well known in the art, the quasi-stable state of a monostable multivibrator may be terminated by the injection of a synchronizing pulse which causes the device to switch or flip over to its stable state prematurely. As a result, the termination of the quasi-stable state need not depend solely upon the time constant of the charging RC network connected to the grid of the "off" tube. This synchronization or premature switching may be accomplished, as described, for example, on pages 189 through 195 of the M.I.T. Radiation Laboratories Series, volume 19, entitled "Waveforms," published by the McGraw-Hill Book Company, Incorporated, in 1949, by adding a positive trigger pulse to the timing waveform applied to the grid of the "off" tube, which pulse carries the grid of the "off" tube above cut-off or above the critical firing voltage and initiates the switching or flipover to the stable state. This premature switching may also advantageously be accomplished by applying a negative trigger pulse to the grid of the "on" tube, which pulse is in turn inverted, amplified, and applied as a positive voltage pulse to the grid of the "off" tube to initiate the switching or flipover to the stable state as described above. This latter method is utilized in the present invention as it advantageously insures that the grid of the "off" tube will be raised substantially above cut-off as the result of the amplified positive voltage trigger pulse applied thereto and provides positive control of the switching or flipover of the device. As shown in FIG. 1, the square pulse output from driver 24 is applied through an RC differentiator 36 to obtain a series of positive going and negative going voltage pips shown graphically at I in FIG. 2. The negative going pips, which are coincident with the trailing edge of the write sync pulses, are selected by unidirectional current device 37 and are then utilized to prematurely reset monopulser 33 as described above, to its normal or untriggered state, thus terminating the enabling sync pulses. In this manner, the trailing edges of the write sync pulses shown at K in FIG. 2 and the trailing edges of the enabling sync pulses shown at N in FIG. 2 are made to coincide.

The preread sync pulses PRS are produced in a manner similar to that described above. As shown in FIG. 1, the 180-degree phase signal and the 90-degree lead phase signal are applied to potentiometer 16, the output of which is applied to amplifier-clipper 40. The square wave output signal from amplifier-clipper 40 is applied to a differentiating network 41 where a series of positive going and negative going voltage pips is obtained. The negative going voltage pips are selected in unidirectional current device 42 to provide the series of negative going voltage pips shown graphically at F in FIG. 2. These pips are applied to monopulser 43 and the square wave output from monopulser 43 is then applied to driver stage 44 and power amplifier 45 to provide the preread sync pulses PRS shown graphically at M in FIG. 2. The circuit elements in monopulser 43 may be selected to provide preread synchronizing pulses having a duration of 2 microseconds, for example. As shown in FIG. 2, the termination of the preread synchronizing pulses PRS and the initiation of the read synchronizing pulses RS are coincident. This coincidence is accomplished in the manner described above, by utilizing the negative going voltage pips in the signal, selected by unidirectional current device 56 from the output of differentiating network 51 to prematurely reset monopulser 43. The circuit elements of monopulser 43 are selected to provide an output pulse having greater than the 2-microsecond duration. Therefore, the termination of the preread synchronizing pulses and the initiation of the read synchronizing pulses coincide.

As indicated previously, the synchronizing pulses delivered by power amplifier stages 25, 35, 45 and 55 are taken from transformers in the plate circuit in the conventional manner. Therefore, either positive going or negative going synchronizing pulses, or both, as required, may be obtained from each of these power amplifier stages.

It is to be understood that each of the synchronizing pulses produced in the manner described above may be initiated and terminated by an individual series of negative going voltage pips. Additional sinusoidal signals with desired phasings may be obtained from potentiometers such as potentiometers 17, 18 and 19 and utilized to produce the required train of voltage pips in the manner previously described. By utilizing individual trains of voltage pips to both trigger and reset each of the monopulsers 23, 33, 43 and 53 in the illustrative embodiment of the invention, the produced synchronizing pulses will have a constant phase relationship to the slot traverse interval and, accordingly, the phasing will be unaffected by variations in the speed of rotation of the magnetic drum. It is to be further understood that the above-described arrangements are but illustrative of the present invention. Numerous other arrangements may be devised by those skilled in the art without departing from the spirit and scope of the invention.

What is claimed is:

1. A synchronizing pulse signal generator for producing a plurality of trains of synchronizing pulse signals comprising in combination, a rotating magnetic drum, means responsive to signals recorded on said drum for producing a first sinusoidal signal, means responsive to said first sinusoidal signal for producing a plurality of sinusoidal signals each having a predetermined phase relationship with said first sinusoidal signal, a plurality of output leads, a plurality of pulse forming means each operative to produce a train of synchronizing pulse signals on a corresponding one of said output leads and means connected to each of said pulse forming means and responsive to a selected pair of said plurality of sinusoidal signals for controlling the phase with respect to said first sinusoidal signal of the pulse signals of said train of synchronizing pulse signals produced thereby.

2. A synchronizing pulse signal generator for producing a plurality of trains of synchronizing pulse signals comprising in combination, a rotating magnetic drum, means responsive to signals recorded on said drum for producing a first sinusoidal signal, means responsive to said first sinusoidal signal for producing a plurality of sinusoidal signals each having a predetermined phase relationship with said first sinusoidal signal, a plurality of pulse forming means each adapted to produce a train of synchronizing pulses, each of said pulse forming means responsive to a selected one of said plurality of sinusoidal signals for producing a train of synchronizing pulse signals with the leading edge of the pulse signals produced thereby having a predetermined phase relationship to said first sinusoidal signal and means connected to each of said pulse forming means and responsive to a selected different one of said plurality of said sinusoidal signals for controlling the phase with respect to said first sinusoidal signal of the trailing edge of the pulse signals of said train of said synchronizing pulse signals produced thereby.

3. The combination of claim 2 in combination with means for individually adjusting the phase of each of said plurality of sinusoidal signals with respect to said first sinusoidal signal.

4. A synchronizing pulse signal generator for producing a plurality of trains of synchronizing pulse signals comprising in combination, a rotating magnetic drum, means responsive to signals recorded on said drum for producing a first sinusoidal signal, phase inverting means responsive to said first sinusoidal signal for producing a second sinusoidal signal lagging by 180 degrees the phase of said first sinusoidal signal, phase shift means responsive to said first sinusoidal signal for producing a third sinusoidal signal leading by 90 degrees the phase of said first sinusoidal signal, phase inverting means responsive to said third sinusoidal signal for producing a fourth sinusoidal signal lagging by 90 degrees the phase of said first sinusoidal signal, a plurality of combining means each responsive to any selected two adjacent phase sinusoidal signals of said first through said fourth sinusoidal signals to produce a sinusoidal signal having a predetermined phase intermediate the phases of said selected two adjacent phase sinusoidal signals, a plurality of output leads, a plurality of pulse forming means each operative to produce a train of synchronizing pulse signals on a corresponding one of said output leads, each of said pulse forming means responsive to selected ones of said first through said fourth sinusoidal signals and said sinusoidal signals produced by said combining means for producing a train of synchronizing pulse signals having a predetermined phase relationship to said first sinusoidal signal.

5. The combination of claim 4 wherein each of said plurality of combining means is adjustable to determine the phase of the sinusoidal signal produced thereby at any desired position intermediate the phases of said selected two adjacent phase sinusoidal signals.

6. A synchronizing pulse signal generator for producing a plurality of trains of synchronizing pulse signals comprising in combination, a rotating magnetic drum, means responsive to signals recorded on said drum for producing a first sinusoidal signal, phase inverting means responsive to said first sinusoidal signal for producing a second sinusoidal signal lagging by 180 degrees the phase of said first sinusoidal signal, phase shift means responsive to said first sinusoidal signal for producing a third sinusoidal signal leading by 90 degrees the phase of said first sinusoidal signal, phase inverting means responsive to said third sinusoidal signal for producing a fourth sinusoidal signal lagging by 90 degrees the phase of said first sinusoidal signal, a plurality of settable combining means each responsive to any selected two adjacent phase sinusoidal signals of said first through said fourth sinusoidal signals to produce a sinusoidal signal having a predetermined and settable phase intermediate the phases of said two selected sinusoidal signals, each of said combining means being adjustable to select predetermined fractional amplitudes of any selected two adjacent phase sinusoidal signals of said first through said fourth sinusoidal signals to produce a sinusoidal signal having a settable predetermined phase intermediate the phase of said selected two adjacent phase sinusoidal signals, a plurality of pulse forming means, each of said pulse forming means responsive to a selected one of said first through said fourth sinusoidal signals and said sinusoidal signals produced by said combining means for producing a train of synchronizing pulse signals with the leading edge of said pulse signals produced thereby having a predetermined phase relationship to said first sinusoidal signal and means connected to said pulse forming means and responsive to a selected different one of said first through said fourth sinusoidal signals and said sinusoidal signals produced by said combining means for controlling the phase with respect to said first sinusoidal signal of the lagging edge of the pulse signals of said train of said synchronizing pulse signals produced thereby.

7. In a synchronizing pulse signal generator for producing a plurality of trains of synchronizing pulse signals, the combination comprising a source of a first sinusoidal signal, means responsive to said first sinusoidal signal for producing a plurality of sinusoidal signals each having a predetermined phase relationship with said first sinusoidal signal, pulse forming means operative to produce a train of synchronizing pulse signals, means connected to said pulse forming means and responsive to a selected pair of said plurality of sinusoidal signals for independently controlling the phase of the leading edge and the trailing edge, respectively, of the pulse signals of said train of synchronizing pulse signals with respect to said first sinusoidal signal.

References Cited in the file of this patent

UNITED STATES PATENTS

| | | |
|---|---|---|
| 2,085,940 | Armstrong | July 6, 1937 |
| 2,540,654 | Cohen et al. | Feb. 6, 1951 |
| 2,609,143 | Stibitz | Sept. 2, 1952 |
| 2,626,357 | McClellan | Jan. 20, 1953 |
| 2,731,590 | Smith | Jan. 17, 1956 |
| 2,794,123 | Younker | May 28, 1957 |
| 2,827,576 | Wohlers | Mar. 18, 1958 |
| 2,831,108 | Barditch | Apr. 15, 1958 |
| 2,838,745 | Wright et al. | June 10, 1958 |
| 2,850,720 | Oliwa et al. | Sept. 2, 1958 |
| 2,886,802 | Henning et al. | May 12, 1959 |